United States Patent [19]

Heichele et al.

[11] 3,960,986

[45] June 1, 1976

[54] IMPACT-RESISTANT MOLDING COMPOSITIONS CONTAINING POLYVINYL CHLORIDE

[75] Inventors: Friedrich Heichele; Georg Vojtechovsky; Georg Hollenbach; Klaus Adler; Johann Bauer, all of Burghausen, Germany

[73] Assignee: Wacker-Chemie GmbH, Munich, Germany

[22] Filed: July 3, 1974

[21] Appl. No.: 485,325

[30] Foreign Application Priority Data

July 13, 1973 Germany............................ 2335734

[52] U.S. Cl........................ 260/876 R; 260/23 XA; 260/28.5 R; 260/28.5 D; 260/28.5 A; 260/28.5 AV; 260/878 R
[51] Int. Cl.$^2$.................. C08L 51/00; C08L 23/00; C08L 91/06
[58] Field of Search...................... 260/876 R, 878 R

[56] References Cited
UNITED STATES PATENTS

| | | | |
|---|---|---|---|
| 3,358,054 | 12/1967 | Hardt et al...................... | 260/876 R |
| 3,517,083 | 6/1970 | Salyer............................ | 260/876 R |
| 3,767,606 | 10/1973 | Kishikawa et al............... | 260/876 R |
| 3,804,705 | 4/1974 | Kishikawa et al............... | 260/876 R |

FOREIGN PATENTS OR APPLICATIONS

| | | | |
|---|---|---|---|
| 1,027,710 | 4/1966 | United Kingdom................ | 260/876 |

*Primary Examiner*—Murray Tillman
*Assistant Examiner*—Thurman K. Page
*Attorney, Agent, or Firm*—Hammond & Littell

[57] ABSTRACT

Impact-resistant molding compositions consisting essentially of
  A. from 20% to 80% by weight of polyvinyl chloride having a K-value of from 55 to 70,
  B. from 19.5% to 75% by weight of a vinyl chloride grafted copolymer of ethylene and vinyl acetate, said copolymer having from 30% to 55% by weight of vinyl acetate monomer units and a Mooney viscosity of from 20 to 50, said vinyl chloride grafted copolymer having from 5% to 15% by weight of said copolymer and a K-value of from 55 to 70, and
  C. from 0.5% to 5% by weight of an ethylene/vinyl acetate copolymer having from 60% to 70% by weight of vinyl acetate monomer units.

3 Claims, No Drawings

IMPACT-RESISTANT MOLDING COMPOSITIONS CONTAINING POLYVINYL CHLORIDE

THE PRIOR ART

It is known to increase the impact resistance of molded polyvinyl chloride by adding copolymers of ethylene and vinyl acetate to the molding composition. Furthermore, it is known to obtain molded products with improved notch impact values by molding graft polymerizates of vinyl chloride on ethylene/vinyl acetate copolymers.

According to German published patent application DOS No. 1,544,873, such graft polymers are added to PVC. This results in a further increase of the notch impact strength. In addition, it is of advantage that these molding material compositions can be produced very easily from powdered PVC and powdered graft polymers, and that stabilizers, fillers and other additives can be easily incorporated therein in a high-speed mixer. But a disadvantage of these molding material compositions is that processing difficulties can appear, for example, in extruders, particularly if the K-values of the products are above 65. This manifests itself in a lack of homogeneity of the products manufactured from the molding compositions.

These difficulties cannot be eliminated with the conventional processing aids, for example, such as those of the type of modified acrylates or methacrylates. However, if the processing temperatures are increased, or if the mechanical shearing is increased during the plasticization, thermal damage is caused in the molding material compositions which results in a drop of the notch impact strength of the finished parts.

OBJECTS OF THE INVENTION

An object of the invention is the development of a molding composition a homogenous homogenous molded form having a high resistance to impact.

Another object of the present invention is the development of a molding composition giving a homogenous molded form having a high resistance to impact, consisting essentially of A. from 20% to 80% by weight of a polyvinyl chloride having a K-value of from 55 to 70,
B. from 19.5% to 75% by weight of a vinyl chloride grafted copolymer of ethylene and vinyl acetate, said copolymer having a content of from 30% to 55% by weight of vinyl acetate units and a Mooney viscosity of from 20 to 50, said vinyl chloride grafted copolymer having a content of from 5% to 15% by weight of said copolymer units and a K-value of from 55 to 70, and
C. from 0.5% to 5% by weight of a copolymer of ethylene and vinyl acetate having a content of from 60% to 70% by weight of vinyl acetate units.

These and other objects of the present invention will become more apparent as the description thereof proceeds.

DESCRIPTION OF THE INVENTION

The above objects have been achieved and impact resistant molding compositions have now been developed based on polyvinyl chloride and vinyl chloride grafted copolymers of ethylene and vinyl acetate which do not have these disadvantages. The molding compositions of the invention consist of:

A. 20% to 80% by weight of polyvinyl chloride with a K-value of 55 to 70.
B. 19.5% to 75% by weight of ethylene/vinyl acetate copolymers grafted with vinyl chloride with 30% to 55% by weight of vinyl acetate and a Mooney viscosity of 20 to 50, where the graft polymer contains 5% to 15% by weight of ethylene/vinyl acetate copolymer and has a K-value of 55 to 70, and
C. 0.5% to 5% by weight of an ethylene/vinyl acetate copolymer with a vinyl acetate content of 60% to 70% by weight.

By the addition of the Component C to the known molding materials, the processing properties of the latter are greatly improved. This can be seen, for example, from the fact that the current consumption of extruders in which these mixtures are processed is more uniform, while without the addition according to the invention, the current consumption varies constantly. Furthermore, the polymer compound according to the invention is completely homogenous after passing through the screw of the extruder, and thus leads to homogenous finished parts. On the other hand, materials without Component C show inhomogeneities.

The homogeneity manifests itself in the finished parts by greater strength and better luster. Furthermore, the molded articles are more uniform on deep drawing.

An additional advantage of the materials according to the invention is that the gelling times are considerably reduced. In addition, the mixtures show greater thermal stability.

The invention therefore relates more particularly to a molding composition giving a homogenous molded form having a high resistance to impact consisting essentially of A. from 20% to 80% by weight of a polyvinyl chloride having a K-value of from 55 to 70,
B. from 19.5% to 75% by weight of a vinyl chloride grafted copolymer of ethylene and vinyl acetate, said copolymer having a content of from 30% to 55% by weight of vinyl acetate units and a Mooney viscosity of from 20 to 50, said vinyl chloride grafted copolymer having a content of from 5% to 15% by weight of said copolymer units and a K-value of from 55 to 70, and
C. from 0.5% to 5% by weight of a copolymer of ethylene and vinyl acetate having a content of from 60% to 70% by weight of vinyl acetate units. Preferably, Component A is present in an amount of from 40% to 70% by weight, Component B in an amount of from 26% to 56% by weight, and Component B in an amount of from 1% to 4% by weight.

In addition, the molding compositions of the invention can optionally contain from 0 to 25% by weight, preferably from 0.1% to 20% by weight, of conventional molding composition aids selected from the group consisting of stabilizers, lubricants, chelators, pigments, fillers and polymeric processing aids.

Any powdery polyvinyl chloride (PVC) can be used for Component A whether suspension, emulsion or block polymerized, which has a K-value of between 55 and 70, measured in cyclohexanone (1% solution). Mostly suspension polymerized PVC is used. The molding material compositions consist preferably of 40% to 70% by weight of PVC.

Component B is produced by grafting vinyl chloride onto a copolymer of ethylene and vinyl acetate. The copolymer should contain 30% to 55% by weight of vinyl acetate units and have a Mooney viscosity of 20 to 50, determined according to DIN 53,523. The grafting is effected according to known methods, for example, by dissolving the copolymer in monomeric vinyl chloride, dispersing the solution in an aqueous phase, and polymerizing by means of free-radical formers, or by grafting the vinyl chloride onto a copolymer latex. The grafted product should contain 5% to 15% by weight of the ethylene/vinyl acetate copolymer and have a K-value of 55 to 70, determined in cyclohexanone (1% solution). Preferably, 26% to 56% by weight, and most particularly 29% to 56% by weight, of the graft polymer of Component B is used.

Component C is an ethylene/vinyl acetate copolymer with 60% to 70% by weight of vinyl acetate units. It has preferably a Mooney viscosity of 10 to 70 (DIN 53,523). Preferably, amounts of 1% to 4% by weight are used in the compositions of the invention.

Such polymers are produced mostly by free-radical polymerization (preferably redox polymerization) in an aqueous emulsion at 0° to 50°C (preferably 10° to 30°C) and an ethylene pressure of 40 to 80 atmospheres while employing molecular weight regulators, such as aldehydes, preferably butyraldehyde. The latex formed is usually coagulated, subsequently dried and ground, and powdered additives can be added, if necessary (amounts of between 1% and 10% by weight of, for example, silica, chalk, talc). But the latex can also be coagulated together with PVC emulsions and then be added in admixture with PVC to the other components.

The production of the molding material compositions is effected by mixing the powdered components, preferably using high-speed mixers.

The customary molding aids can optionally be added to the molding material compositions, such as stabilizers in amounts of from 0% to 5%, preferably 0.5% to 3% by weight; lubricants in amounts of from 0% to 4%, preferably 0.1% to 3% by weight; chelators in amounts of from 0% to 2%, preferably 0.1% to 1.5% by weight; pigments and dyes in amounts of from 0% to 5%, preferably 1% to 4% by weight; fillers in amounts of from 0% to 10% by weight; and processing aids in amounts of from 0% to 5%, preferably 1% to 4% by weight.

Conventional stabilizers for PVC employed are the metallic salts of acids, preferably metals such as lead, barium, cadmium and mixed salts such as barium-cadmium and calcium-zinc with inorganic acids such as sulfuric acid; aminocrotonic acid esters; dithioureas, phenylindole, etc. The epoxidized unsaturated fatty oils, such as epoxidized soybean oil, act both as stabilizers and plasticizers. The chelators are the organic phosphites. Conventional pigments and dyes such as titanium dioxide are employed. The lubricants employed are the waxes, polyethylene waxes, higher molecular fatty alcohols, alkyl esters of long-chained dicarboxylic acids and higher fatty acids and heavy metal and alkaline earth metal salts of higher fatty acids. The processing aids are, for example, the modified methacrylate- and acrylate-polymers, and styrene acrylonitrile polymers.

The molding material compositions according to the invention are particularly suitable for the production of impact-resistant articles from powdered mixtures in extruders or injection molding machines, as for example, sections, plates. The mixtures are also suitable for foaming.

The following examples are illustrative of the invention without being limitative in any respect.

EXAMPLE 1

A homogenous powder mixture A was produced from the following components:

| | |
|---|---|
| 50 parts by weight | of suspension polymerized PVC with a K-value of 60 |
| 50 parts by weight | of a graft copolymer from vinyl chloride and 10 parts by weight of an ethylene/ vinyl acetate copolymer having a content of 45% by weight of vinyl acetate units and a K-value of 68 |
| 1.5 parts by weight | of an ethylene/vinyl acetate copolymer having a content of 60 parts by weight of vinyl acetate, a Mooney viscosity of 50, and a melt index $i_{10}$ of 0.3 (ASTM 123,862 T) |
| 2.5 parts by weight | of a solid barium-cadmium stabilizer |
| 0.5 parts by weight | of a chelator (organophosphite) |
| 2 parts by weight | of epoxidized soybean oil |
| 1 part by weight | of a lubricant containing hydroxystearic acid, a long-chained dicarboxylic acid and polyethylene wax |
| 2.5 parts by weight | of a processing aid based on modified acrylates |
| 3 parts by weight | of titanium dioxide | by mixing for 10 minutes in a fluid mixer combination.

From the same components, another powder mixture B was produced, but without the addition of an ethylene/vinyl acetate copolymer (component C) under the same mixing conditions.

a. Gelling time of the powders

The mixtures A and B were kneaded in a Brabender plastograph at 160°C until gellation occurred. In mixture A the gellation occurred after 10 minutes already, while it took 21 minutes for mixture B. The power consumption in mixture A was slightly lower.

b. Extrusion of plates

Plates were produced from mixtures A and B in a Kestermann extruder, Type K 86-0-16-D with a Reifenhaeuser flat sheet die. The fluctuations in the current consumption and torque occurring during the processing were recorded for each of mixtures A and B. It was found that the fluctuations in mixture A were about 12 mkp, in mixture B 25 mkp. This means that mixture A yields homogenous batches and thus homogenous molded parts.

c. Thermal stability

Samples of the plates produced under (b) were stored in a furnace at 190°C. After 345 minutes the plates of mixture B showed signs of decomposition, while the plates of mixture A began to turn brown only after 50 minutes storage.

Furthermore, the stability according to the pH-method (DIN 53,383 sheet 3) was determined. It was found that the decomposition limit was achieved with plates of mixture A after 47 minutes, and plates of mixture B after 41 minutes.

d. Surface examination

Luster measurements were made on plates of mixtures A and B according to ASTM D 523. The measurements were made diagonally at five measuring points with an angle of incidence of 60°C.

The luster of the plates of mixture A was determined to be 79.1; that of the plates of B to be 60.4.

e. Notch impact strength

The notch impact strength in cmkp/m$^2$ was determined at 22°C and at −20°C.

For mixture A, a value of 20.5 (cracked) was obtained at 22°C and at −20°C value of 3.6. For mixture B the values were 10 at 22°C and 2.4 at −20°C.

f. Deepdrawing of plates

The plates produced according to (b) (thickness 4 mm) were deep-drawn on the Plastiplast apparatus, type Piccolo. The surface radiator was arranged in a distance of 20 cm from the plate surface. The plates were heated on one side and were deformed after a radiation of 8 minutes. The drawing rate was kept constant.

The molds produced from mixture A showed a much more uniform wall thickness distribution.

EXAMPLE 2

A mixture C was produced from 70 parts by weight of a PVC batch with a K-value of 65 and 30 parts by weight of a graft copolymer from vinyl chloride and 10 parts by weight of an ethylene/vinyl acetate copolymer having a content of 45 parts by weight of vinyl acetate units and a K-value of 68, as well as 4 parts of an ethylene/vinyl acetate copolymer having a content of 65% by weight of vinyl acetate units, a Mooney viscosity of 15, and a melt index $i_{10}$ of 50 (ASTM 123,862 T), using the same stabilizers, lubricants, processing aids, pigments and chelators as in Example 1.

Another mixture D was mixed from the same components, but without the ethylene/vinyl acetate copolymer of Component C.

The mixtures were tested as in Example 1.

a. Gelling time of the powders

The gellation time for mixture C was 7½ minutes, for mixture D 24½ minutes. The power consumption was lower with mixture C.

b. Extrusion of plates

Corresponding to Example (1b), plates were produced from both mixtures. The fluctuations in the power consumption were for mixture C in a range of 10 mkp, while for mixture D a fluctuation range of 30 mkp was determined.

c. Thermal stability

The thermal stability during the storage in the furnace was 50 minutes for mixture C and 35 minutes for mixture D.

d. Surface examination

The luster, measured according to Example 1, was 80.5 for mixture C and 63 for mixture D.

e. Notch impact strength

The notch impact strength at 22°C was determined to be 8.7 for mixture C and 5.7 for mixture D.

The preceding specific embodiments are illustrative of the practice of the invention without being limitative in any manner. It is to be understood that other expedients known to those skilled in the art or disclosed herein may be employed without departing from the spirit of the invention or the scope of the appended claims.

We claim:

1. A molding composition giving a homogenous molded form having a high resistance to impact consisting essentially of
   A. from 40% to 70% by weight of a polyvinyl chloride having a K-value of from 55 to 70,
   B. from 26% to 56% by weight of a vinyl chloride grafted copolymer of ethylene and vinyl acetate, said copolymer having a content of from 30% to 55% by weight of vinyl acetate units and a Mooney viscosity of from 20 to 50, said vinyl chloride grafted copolymer having a content of from 5% to 15% by weight of said copolymer units and a K-value of from 55 to 70, and
   C. from 1% to 4% by weight of a copolymer of ethylene and vinyl acetate having a content of from 60% to 70% by weight of vinyl acetate units and a Mooney viscosity of 10 to 70.

2. The molding composition of claim 1 containing from 49.3% to 67.3% by weight of Component A, from 29.8% to 49.3% by weight of component B, and from 1.4% to 3.7% by weight of Component C.

3. The molding composition of claim 1 having a further content of from 0.1% to 20% by weight of conventional molding composition aids selected from the group consisting of stabilizers, lubricants, chelators, pigments, fillers and polymeric processing aids.

* * * * *